(12) United States Patent
Blanchflower et al.

(10) Patent No.: US 8,953,054 B2
(45) Date of Patent: *Feb. 10, 2015

(54) SYSTEM TO AUGMENT A VISUAL DATA STREAM BASED ON A COMBINATION OF GEOGRAPHICAL AND VISUAL INFORMATION

(71) Applicant: Longsand Limited, Cambridge (GB)

(72) Inventors: Sean Mark Blanchflower, Cambridge (GB); Michael Richard Lynch, Cambridge (GB)

(73) Assignee: Longsand Limited (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/940,069

(22) Filed: Jul. 11, 2013

(65) Prior Publication Data

US 2013/0307873 A1   Nov. 21, 2013

Related U.S. Application Data

(63) Continuation of application No. 13/023,463, filed on Feb. 8, 2011, now Pat. No. 8,488,011.

(51) Int. Cl.
*H04N 5/232* (2006.01)
*H04N 5/222* (2006.01)
*G06T 11/60* (2006.01)
(Continued)

(52) U.S. Cl.
CPC .............. *G06T 11/60* (2013.01); *H04N 21/254* (2013.01); *H04N 21/41407* (2013.01); *H04N 21/4223* (2013.01); *H04N 21/4355* (2013.01); *H04N 21/4524* (2013.01); *H04N 21/6581* (2013.01);
(Continued)

(58) Field of Classification Search
CPC ........................... H04N 5/232; H04N 5/23206
USPC .............................. 348/207.99, 333.05, 211.3
See application file for complete search history.

(56) References Cited

U.S. PATENT DOCUMENTS 6,272,231 B1   8/2001   Maurer
6,400,374 B2   6/2002   Lanier
(Continued)

FOREIGN PATENT DOCUMENTS

GB        2436924        10/2007

OTHER PUBLICATIONS

Autonomy press release, "Thrasher Magazine and Aurasma Launch Comprehensive Augmented Reality Promotion for SXSW and Beyond", http://www.autonomy.com/content/News/Releases/2012/0313.en.html, Mar. 13, 2012, 2 pages.
(Continued)

*Primary Examiner* — Ahmed A Berhan
(74) *Attorney, Agent, or Firm* — Mannava & Kang, P.C.

(57) ABSTRACT

According to an example, a computing device includes a memory on which is stored machine readable instructions that may cause a processor to access a video stream, generate geographical information associated with frames of the video stream, extract features of points of interest in the frames, transmit the extracted features of the points of interest and the geographical information to a server computer that is to use the extracted features of the points of interest and the geographical information to identify augment information, receive the augment information from the server computer, and augment the video stream with the augment information to generate an augmented video stream.

27 Claims, 11 Drawing Sheets

(51) Int. Cl.
*H04N 21/254* (2011.01)
*H04N 21/414* (2011.01)
*H04N 21/4223* (2011.01)
*H04N 21/435* (2011.01)
*H04N 21/45* (2011.01)
*H04N 21/658* (2011.01)
*H04N 21/81* (2011.01)

(52) U.S. Cl.
CPC ....... *H04N 21/8126* (2013.01); *H04N 5/23229* (2013.01)
USPC .................................. 348/211.3; 348/333.02

(56) References Cited

U.S. PATENT DOCUMENTS

| | | | |
|---|---|---|---|
| 6,563,950 | B1 | 5/2003 | Wiskott et al. |
| 6,714,661 | B2 | 3/2004 | Buddenmeier et al. |
| 6,845,338 | B1 | 1/2005 | Willins et al. |
| 6,906,643 | B2 * | 6/2005 | Samadani et al. ........ 340/995.18 |
| 7,050,787 | B2 * | 5/2006 | Caci ........................... 455/404.2 |
| 7,084,809 | B2 | 8/2006 | Hockley et al. |
| 7,177,651 | B1 | 2/2007 | Almassy |
| 7,389,526 | B1 | 6/2008 | Chang et al. |
| 7,471,301 | B2 | 12/2008 | Lefevre |
| 7,565,139 | B2 | 7/2009 | Neven, Sr. et al. |
| 8,005,958 | B2 | 8/2011 | Hannel et al. |
| 8,010,327 | B2 | 8/2011 | Copenhagen et al. |
| 8,160,980 | B2 | 4/2012 | Da Silva et al. |
| 8,400,548 | B2 * | 3/2013 | Bilbrey et al. ........... 348/333.01 |
| 2004/0258311 | A1 | 12/2004 | Barbehoen et al. |
| 2005/0055281 | A1 | 3/2005 | Williams |
| 2005/0227674 | A1 | 10/2005 | Kopra et al. |
| 2006/0218191 | A1 | 9/2006 | Gopalakrishnan |
| 2006/0227992 | A1 | 10/2006 | Rathus et al. |
| 2007/0161383 | A1 | 7/2007 | Caci |
| 2008/0077952 | A1 * | 3/2008 | St. Jean et al. ................ 725/32 |
| 2008/0165843 | A1 * | 7/2008 | Dvir et al. ................ 375/240.01 |
| 2008/0188246 | A1 | 8/2008 | Sheha et al. |
| 2008/0214153 | A1 | 9/2008 | Ramer et al. |
| 2008/0268870 | A1 | 10/2008 | Houri |
| 2008/0268876 | A1 * | 10/2008 | Gelfand et al. ............... 455/457 |
| 2009/0061901 | A1 | 3/2009 | Arrasvuori et al. |
| 2009/0070797 | A1 | 3/2009 | Ramaswamy et al. |
| 2009/0102859 | A1 | 4/2009 | Thsani et al. |
| 2009/0176520 | A1 | 7/2009 | B. S. et al. |
| 2009/0232354 | A1 | 9/2009 | Camp, Jr. et al. |
| 2009/0233629 | A1 | 9/2009 | Jayanthi |
| 2009/0276154 | A1 | 11/2009 | Subramanian et al. |
| 2010/0060632 | A1 | 3/2010 | Lefevre et al. |
| 2010/0103241 | A1 | 4/2010 | Linaker et al. |
| 2010/0107185 | A1 | 4/2010 | Shintani |
| 2010/0115114 | A1 | 5/2010 | Headley |
| 2010/0220891 | A1 | 9/2010 | Lefevre et al. |
| 2010/0293224 | A1 * | 11/2010 | Moriwaki ..................... 709/203 |
| 2010/0309225 | A1 | 12/2010 | Gray et al. |
| 2010/0325126 | A1 | 12/2010 | Rajaram et al. |
| 2011/0164163 | A1 | 7/2011 | Bilbrey et al. |
| 2011/0187744 | A1 * | 8/2011 | Kim et al. ..................... 345/633 |
| 2011/0199479 | A1 * | 8/2011 | Waldman ..................... 348/116 |
| 2011/0210959 | A1 | 9/2011 | Howard et al. |
| 2011/0223931 | A1 | 9/2011 | Buer et al. |
| 2012/0025977 | A1 | 2/2012 | Schantz et al. |

OTHER PUBLICATIONS

Cellan-Jones, Rory, "Aurasma: Augmented reality future or forgettable fun?", BBC Technology News, May 26, 2011, 5 pages.

Marks, Paul, "Aurasma App is Augmented Reality, Augmented", newscientist.com, http://www.newscientist.com/blogs/onepercent/2011/05/how-the-reverend-bayes-will-fi.html, May 20, 2011, 5 pages.

International Search Report and Written Opinion for International Patent Application No. PCT/US2012/024068 dated May 23, 2012, 8 pages.

International Search Report and Written Opinion for International Patent Application No. PCT/US2012/024071 dated Apr. 5, 2012, 9 pages.

International Search Report and Written Opinion for International Patent Application No. PCT/US2012/024074 dated Apr. 19, 2012, 11 pages.

International Search Report and Written Opinion for International Patent Application No. PCT/US2012/024063 dated May 25, 2012, 8 pages.

* cited by examiner

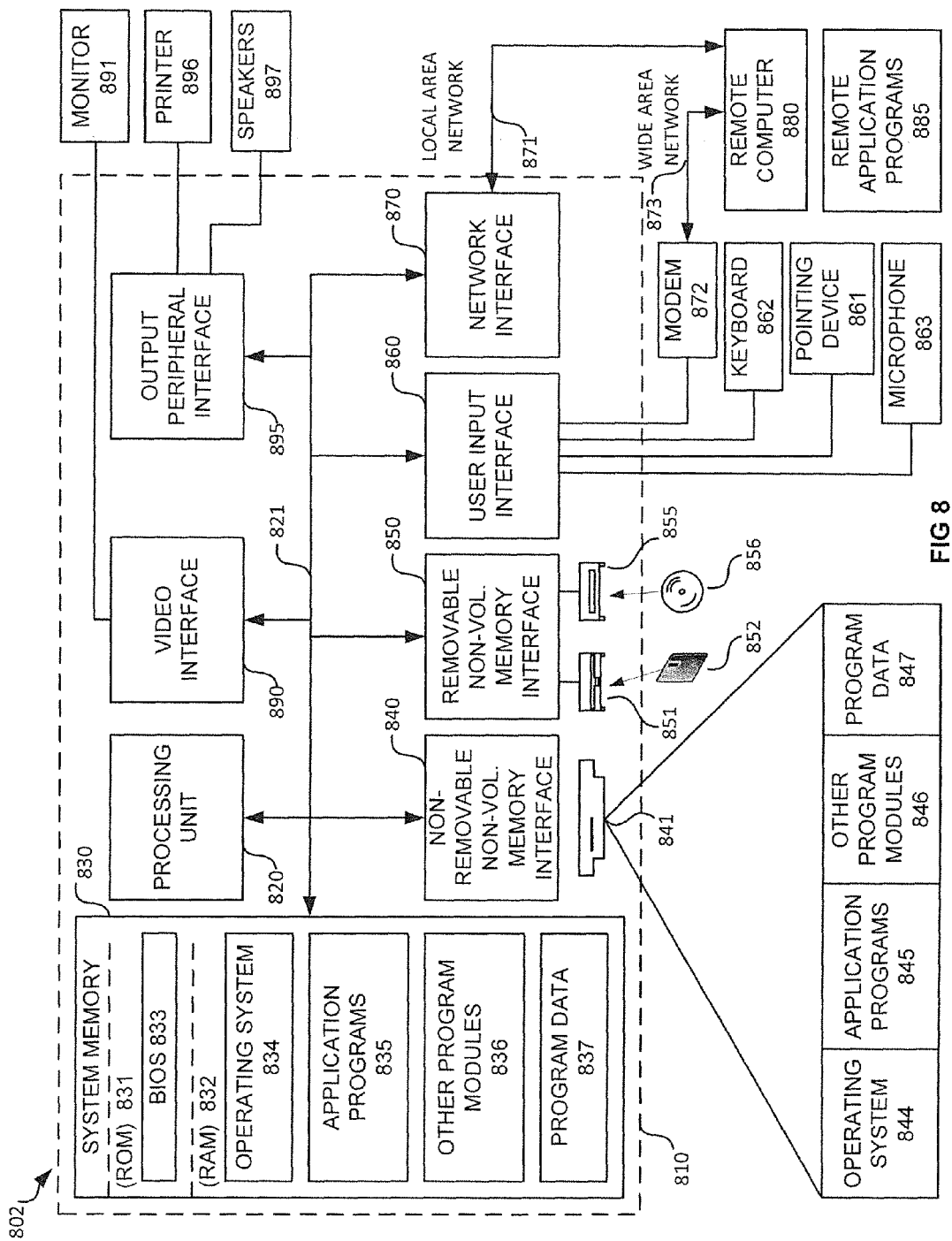

SYSTEM TO AUGMENT A VISUAL DATA STREAM BASED ON A COMBINATION OF GEOGRAPHICAL AND VISUAL INFORMATION

CLAIM FOR PRIORITY

This application is a continuation application of commonly assigned and copending U.S. patent application Ser. No. 13/023,463, filed on Feb. 8, 2011, the disclosure of which is hereby incorporated by reference in its entirety.

FIELD

Embodiments of the present invention generally relate to the field of digital image processing, and in some embodiments, specifically relate to inserting information messages into videos.

BACKGROUND

Various types of video capturing devices are available in the market today at very affordable prices. This allows many consumers the ability to capture video for any occasions at any place and any time. Typically, the content of the captured video is limited to what is visible to the operator of the video capture device. For example, when the operator is videotaping a building because of its unique architecture, what the operator sees in a viewfinder or on a display of the video capturing device are images of the same building and nothing more.

SUMMARY

For some embodiments, a mobile computing device may be configured to enable a user to capture a video stream and view the video stream after the video stream has been augmented in real time. The mobile computing device, equipped with a global positioning system (GPS), may generate geographical information for the video stream. A server computer coupled with the mobile computing device may be configured to receive visual information about points of interest in the video stream and the geographical information from the mobile computing device. The server computer then identifies augment information and transmits the augment information to the mobile computing device. The augment information may be used to augment the captured video stream to create an augmented video stream, which may be viewed by the user on a display screen of the mobile computing device.

BRIEF DESCRIPTION OF THE DRAWINGS

The multiple drawings refer to the embodiments of the invention. While embodiments of the invention described herein is subject to various modifications and alternative forms, specific embodiments thereof have been shown by way of example in the drawings and will herein be described in detail.

FIG. 8 illustrates an example computer system that may be used to implement an augmented video stream, in accordance with some embodiments.

DETAILED DESCRIPTION

Figure 1:
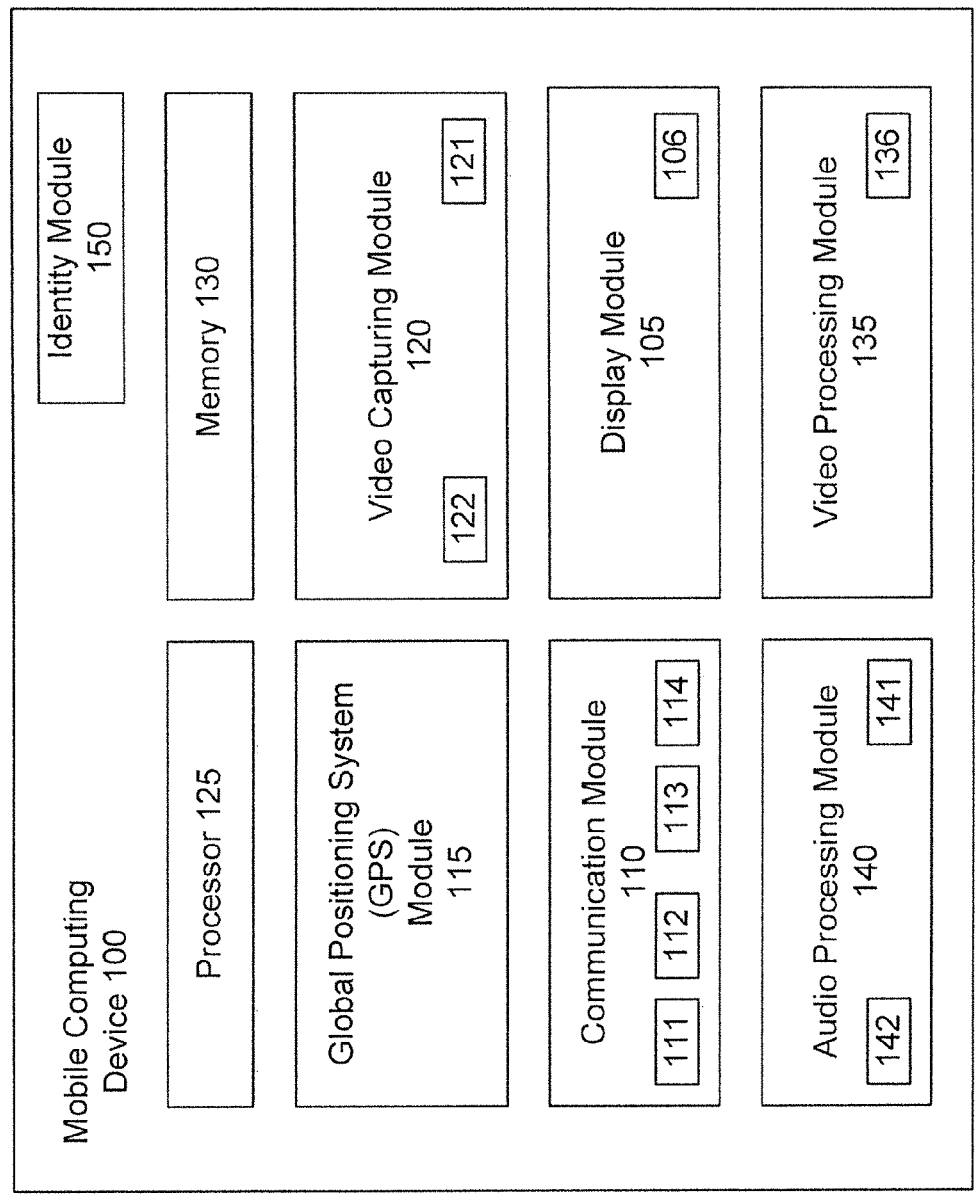
FIG. 1 illustrates one example of a mobile computing device that may be used, in accordance with some embodiments.

For some embodiments, a mobile computing device is configured to augment video streams with augment information received from a server computer connected to a network is disclosed. The mobile computing system includes a processor, a memory, a built in battery to power the mobile computing device, a built-in video camera, a display screen, and built-in Wi-Fi circuitry to wirelessly communicate with the server computer. The mobile computing device includes a video capturing module coupled with the processor and configured to capture a video stream, a global positioning system (GPS) module coupled with the video capturing module and configured to generate geographical information associated with frames of the video stream to be captured by the video capturing module. The mobile computing device also includes a video processing module coupled with the video capturing module and configured to analyze the frames of the video stream and extract features of points of interest included in the frames. The video processing module is also configured to cause transmission of the features of the points of interest and the geographical information to the server computer and to receive the augment information from the server computer. The video processing module is configured to 1) overlay, 2) highlight, or 3) combination of both the points of interests in the frames of the video stream with the augment information to generate an augmented video stream. The augmented video stream is then displayed on a display screen of the mobile computing device.

In the following description, numerous specific details are set forth, such as examples of specific data signals, components, connections, etc. in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Thus, the specific details set forth are merely exemplary. The specific details may be varied from and still be contemplated to be within the spirit and scope of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages such as C, C++, Java, or other similar languages. Also, an algorithm may be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled with a computer system bus. Portions of any modules or components described herein may be implemented in lines of code in software, configured logic gates in software, or a combination of both, and the portions implemented in software are tangibly stored on a computer readable storage medium.

The algorithms and displays presented herein are not inherently related to any particular computer or other apparatus. Various general purpose systems may be used with programs in accordance with the teachings herein, or it may prove convenient to construct more specialized apparatus to perform the required method blocks. The required structure for a variety of these systems will appear from the description below.

In the following description of exemplary embodiments, reference is made to the accompanying drawings that form a part hereof, and in which it is shown by way of illustration specific embodiments in which the invention can be practiced. It is to be understood that other embodiments can be used and structural changes can be made without departing from the scope of the embodiments of this invention. As used herein, the terms "couple," "connect," and "attach" are interchangeable and include various forms of connecting one part to another either directly or indirectly. Also, it should be appreciated that one or more structural features described in one embodiment could be implemented in a different embodiment, even if not specifically mentioned as being a feature thereof.

Overview

Embodiments of the present invention provide a scalable way of combining two or more data sources including using the visual information to trigger augmentations and the geographical location to allow advanced augmentation of the captured video stream. Information presented by video streams is typically limited to what is visible or audible to the users such as geometric shapes, colors patterns associated with that shape, symbols and other features associated with objects in that video stream. There may be much more in-depth information associated with the scenes in the video streams that is not conveyed to the user. The use of visual information or characteristics information about points of interest or objects alone to augment a video stream may be useful but may not be sufficient or scalable when the volume of visual information or characteristics information is large. The use of geographical information alone may not permit the augmentation of specific objects or views of the scenes in the video stream Combining the visual information and the geographical information may allow a rapid recognition or matching to the characteristics of objects that are known and pre-stored in an object database. The geographical information may be provided by a global positioning system (GPS). Combining the visual information with the geographical information may reduce the amount of possible points of interest that need to be sorted through by a server computer to identify and recognize known objects and/or persons. The rough geographical information from the GPS reduces the amount of possible points of interest that need to be sorted through as a possible match to known objects in that area. Further, direction information about where a video camera of the mobile computing device is facing when capturing the video stream is also transmitted to the server computer. The direction information may be provided by a built-in compass or direction sensor in the mobile computing device to the server computer along with the features of the points of interest in that frame. All of these assist in reducing the sheer number of potential views to comparing the characteristics information transmitted from the mobile computing device to known objects stored in a database making a scalable and manageable system.

Mobile Computing Device and Generation of Augmented Video Streams

FIG. 1 illustrates one example of a mobile computing device that may be used, in accordance with some embodiments. Mobile computing device 100 may include display module 105, communication module 110, global positioning system (GPS) module 115, video capturing module 120, processor 125, and memory 130. The mobile computing device 100 may be, for example, a cellular phone, a laptop, a netbook, a touch pad, or any other similar devices. The mobile computing device 100 cooperates with the network 200 (see FIG. 2) to supply augment information to points of interest captured in the frames of a video stream in the mobile computing device 100 based on a combination of geographical and visual information. The mobile computing device 100 includes video processing module 135 on the mobile computing device 100 to assist in the identification of objects captured in each video frame as well as then insert the augment information into the frames of the video stream.

Figure 2:
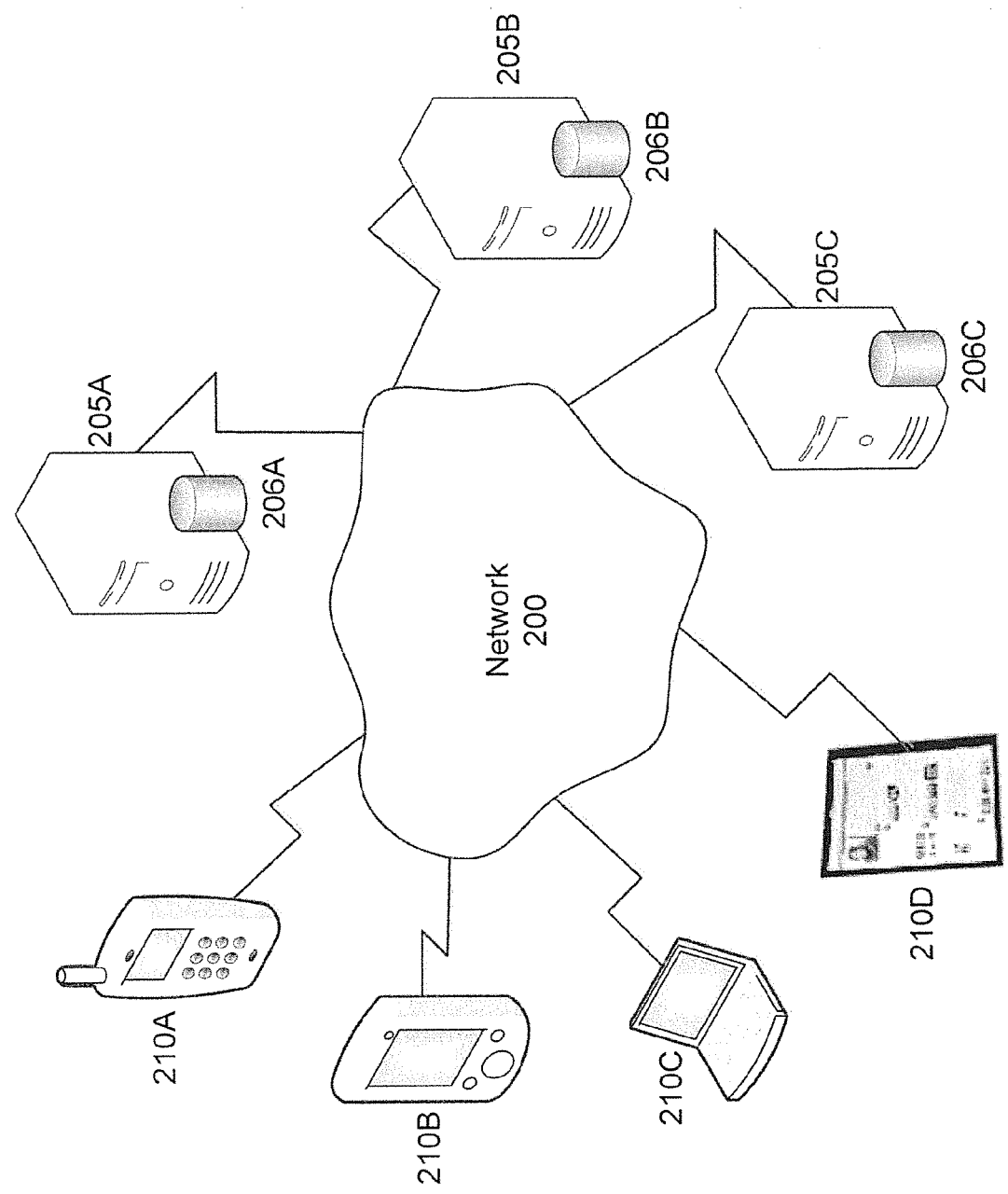
FIG. 2 illustrates an example of a network that may be used to augment a captured video stream, in accordance with some embodiments.

The communication module 110 may be used to allow the mobile computing device 100 to be connected to a network such as, for example, the network 200 (see FIG. 2). The communication module 110 may be configured to enable the mobile computing device 100 to connect to the network 200 using wireless communication protocol or any other suitable communication protocols. For example, the communication module 110 may include a wireless fidelity (Wi-Fi) module 111, a Bluetooth module 112, a broadband module 113, a short message service (SMS) module 114, and so on. As will be described, the communication module 110 may be configured to transmit visual information associated with a video stream from the mobile computing device 100 to one or more server computers connected to the network 200.

The GPS module 115 may be used to enable the user to get directions from one location to another location. The GPS module 115 may also be used to enable generating the geographical information and associating the geographical information with images and frames of video streams. This process is typically referred to as geotagging. When the mobile computing device 100 is used to capture a video stream, the geographical information may be inserted into one or more the frames of the video stream. The geographical information may be inserted and stored with images, video streams, and text messages generated by the mobile computing device 100. The geographical information may be stored as metadata, and may include latitude and longitude coordinates. For example, the server system for the tagging and augmentation of geographically-specific locations can use a location of a building in an image by using the latitude and longitude coordinates associated or stored with that image and other distinctive features of the building to determine what objects are appearing in a video stream.

The video capturing module 120 may be configured to capture images or video streams. The video capturing module 120 may be associated with a video camera 121 and may enable a user to capture the images and/or the video streams. The video capturing module 120 may be associated with a direction sensor 122 to sense the direction that the video camera 121 is pointing to. The video camera 121 may be a built-in video camera.

The display module 105 may be configured to display the images and/or the video streams captured by the video capturing module 120. For some embodiments, the display module 105 may be configured to display the images and/or the video streams that have been augmented with the augment information stored in a database in the network. The display module 105 may be associated with a display screen 106.

The memory 130 may include internal memory and expansion memory. For example, the internal memory may include read-only memory (ROM) and random access memory (RAM), and the expansion memory may include flash memory. The memory 130 may be used to store an operating system (OS) and various other applications including, for example, productivity applications, entertainment applications, communication applications, image and/or video processing applications, user interface applications, etc. The processor 125 may be configured to execute instructions associated with the OS, network browsers, and the various applications. Some examples of the OS may include Android from Google, iOS from Apple, Windows Phone from Microsoft, and WebOS from Palm/HP, and so on. The network browsers may be used by the mobile computing device 100 to allow the user to access websites using the network 200.

For some embodiments, the mobile computing device 100 may include a video processing module 135 configured to process images and/or video streams captured by the video capturing module 120. The video processing module 135 may analyze the frames of the captured video stream and identify the objects/points of interest within each frame of the captured video stream. Identifying the points of interest for an object may include breaking the object into geometric shapes and distinctive features. The operations may apply to a set of objects with each object in the set broken down into different geometric shapes and associated distinctive features.

The video processing module 135 may use an extraction algorithm to identify the features of the points of interest in a frame and extract those features, along with the geographical information, and other relevant information and transmits that packet of information about that frame up to the server computer (see FIG. 3A), for each frame being captured by the video camera 121. The video processing module 135 may generate a pattern of X-Y coordinates of the geometric shapes of the point of interest and the color associated with the shapes. The video processing module 135 may extract the direction information from a compass or direction sensor 122 associated with the video camera 121 to determine the direction that the video camera 121 is facing when capturing the frames in the video stream. The direction information provided by the direction sensor 122 may include north, south, east, west, up, down, and any possible related combinations (e.g., Northwest and up 20 degrees from a horizontal plane, etc.). For some embodiments, the pattern of points used for the points of interests, the amount of points used, and the amounts of points of interest may be dependent on the amount of distinct points of interest in the frame. Non-centered or periphery objects in the frame, small objects, and non-distinctive objects can be filtered out by the extraction algorithm, while only bold and distinctive features on the points of interest may be extracted.

The video processing module 135 may analyze each captured frame of the video stream. The video processing module 135 may relate patterns from the series of frames to assist in determining what the points/objects of interest are. The video processing module 135 may relate patterns from the series of frames to assist in to enable faster transmission of the features of the points of interest. For some embodiments, no transmission of the features from a particular frame may be necessary if there is no change to the same features that were previously transmitted. For some embodiments, if a current frame includes features that are different from the previous frame, only the difference in the change of features is transmitted.

For some embodiments, the objects/points of interest may generally be located in the center area of the frames. It may be noted that certain consecutive frames of the captured video stream may have the same object in the center area or at least contained within the series of consecutive frames. The video processing module 135 may analyze these frames to identify the characteristics or visual information of the object. As the video capturing module 135 continues to capture the video stream, it may be possible that the video processing module 135 may identify many different objects.

The video processing module 135 may perform basic scene analysis including using optical character recognition (OCR) to extract the distinctive features of the points of interest within the frames of the captured video stream, code them into the small pattern of X-Y coordinates for geometric shape format with associated distinctive color and pattern information for that feature. The video processing module 135 may identify the geographical information of that object and other known distinctive features for that object. For some embodiments, the information transmitted by the mobile computing device 100 to the server computer may be in the form of texts.

The above operations performed by the video processing module 135 can be used to minimize the size of the file being transmitted to the server and hasten the near real time recognition by the server of the points of interest and near real time transmitting the augment information to the mobile computing device 100. Rather than trying to transmit a JPEG or MPEG type file, the video processing module 135 identifies and extracts distinctive features including shapes, dot-to-dot type X-Y coordinates of the shapes, patterns colors, letters numbers, symbols, etc. associated with objects/points of interest in the video frame to minimize the size of the file being transmitted to the server computer and hasten the near real time recognition by the server computer of the points of interest and the near real time transmission of the augment information to the mobile computing device 100. The augment information is to be overlaid onto the points of interest or highlighted on the points of interest so the user can activate to view and/or hear the augment information overlaid with the captured video stream. As the transmission speeds increase, the entire images may be transmitted on a continuous basis to the server computer. Other techniques that may be used to reduce the amount of information transmitted between the mobile computing device 100 and the server computer may include transmitting the color images in black and white gray scale, transmitting reduced dots per inch (DPI) images, etc.

For some embodiments, the points of interest in a frame may be related to a person. The video processing module 135 may be configured to analyze the frames of the captured video stream and identify facial characteristics or visual information of a person that may be in the center area of the frames. As the video processing module 135 analyzes the many frames of the captured video stream, it is possible that the video processing module 135 may identify many different persons.

The video processing module 135 may include a compress-decompress (codec) module 136. For some embodiments, the codec 136 may compress the captured video stream into a DivX format. DivX is a video compression technology developed by DivX, LLC of San Diego, Calif. The DivX format may enable users to quickly play and create high-quality video streams. DivX codec is a popular Moving Picture Experts Group-4 (MPEG-4) based codec because of its quality, speed and efficiency. As a DivX codec, the codec 136 may enable the captured video streams and/or the identified features or characteristics information of the objects/points of interest to be quickly transmitted to a server computer where the communication bandwidth may be limited (e.g., wireless communication). Other techniques that enable fast transmission of information from the mobile computing device to a server computer may also be used. For example, instead of transmitting an image or a captured video stream in its original color, a conversion may be performed to convert the image or the captured video stream from color to black and white to reduce the size of the information to be transferred.

Chirp Signals Transmission, Detection, Location Approximation

The mobile computing device 100 with potentially a little interaction with the server computer may detect and determine a spatially-accurate location of one or more mobile computing devices using audio and/or visual information. For some embodiments, the mobile computing device 100 may include an audio processing module 140 to process audio information. The audio processing module 140 may include a chirp signal generating module 141 and speakers 142. The chirp signal generating module 141 may be configured to transmit chirp signals in a certain frequency pattern (e.g., high frequency noise, low frequency noise). The chirp signals may be transmitted by the mobile computing device 100 and received by another mobile computing device located nearby. A time gap between when the chirp signal is transmitted and when it is received may be used to estimate how far the two mobile computing devices are from one another. A first mobile computing device in this example may transmit its own chirp signals and may receive the chirp signals transmitted by a second mobile computing device. The difference in the high and low frequency signals may be used to determine the distance traveled by the chirp from the first (or sending) mobile computing device and the second (or receiving) mobile computing device.

In an alternative, a mobile computing device may transmit a time-stamped notification to the server computer 300 to indicate that a chirp signal has been transmitted. Another mobile computing device may transmit a time-stamped notification to the server computer 300 to indicate that a chirp signal has been received or detected. The server computer 300 then calculates the distance between the two mobile computing devices based on the time difference between the transmitting notification and the receiving notification. For some embodiments, the transmission and the receipt of the chirp signals may be used to direct the two users of the two mobile computing devices toward one another. It may be noted that the server computer 300 may already know the identity of the users using the two mobile computing devices based on the identity information associated with the two mobile computing devices.

The mobile computing device 100 is an audio/video enabled device (e.g., an iPhone). The chirp signal generating module 141 allows a user holding the mobile computing device 100 to detect and locate other users holding similar mobile computing devices within the vicinity. The audio processing module 140 may allow detection of people within the vicinity based on both mobile computing devices transmitting and receiving the chirp signals or based on using facial recognition engine 320 (see FIG. 3A).

For some embodiments, one audio-signal-based-distance-calculation methodology that may be used is as follows. The two mobile computing devices transmit/broadcast chirp signals to each other to work out the distance between them. A third mobile computing device can also listen and identify the two chirp signals from the other two mobile computing devices, and thereby enable the calculation of the exact position (using X-V coordinates).

As discussed, the chirp signals frequencies are used to detect proximity of the two users. The two mobile computing devices broadcast the chirp signals in turn. Each mobile computing device with its microphone and/or audio receiver notes/detects the times when the chirp signals were broadcast and detected. Based on these time values, the distance between the two mobile computing devices is calculated. The audio processing module 140 of one mobile computing device is configured to calculate the distance to the other mobile computing device (or the user holding the device). Alternatively, the audio processing module 140 also allows the calculation of the exact position (exact distance and direction) of the other person, when a third observing mobile computing device (placed at a predetermined position) is employed. The audio processing module 140 is configured to triangulate the positions of all three mobile computing devices. The audio processing module 140 then will generate approximate direction of the other mobile computing device by text indicating direction and distance.

The audio processing module 140 may insert an arrow in the video stream being played on the mobile computing device. The arrow may indicate the direction that the user of the mobile computing device should walk to get to the other person. The direction information may overlay the video stream being viewed on the display screen. As discussed earlier, an alternative implementation may use notification signals from both mobile computing devices and communicated to the server computer 300 to determine distance between the mobile computing devices when the use of the facial recognition operations may not be possible. The notification may be generated by the audio processing module 140 to enable the users to identify and locate the other mobile computing devices or users within the same vicinity.

The audio processing module 140 may include coded algorithms that enable generating chirping pattern at a set audio frequencies and detecting the chirp signals. The algorithms also enable determining distance from the current mobile computing device to the mobile computing device that transmits or broadcasts the detected chirp signals. Algorithms are also employed to minimize the distance calculation errors due to acoustic echo paths. Rather than generating a high frequency/low frequency signals beyond the capabilities/range of operation of a standard mobile computing device's speaker system and microphone system to avoid background noise, the chirp signals may be a series of high and low frequency bursts within the standard range of both the microphone and speaker system but that burst sequence at those frequencies does not happen naturally in nature. The audio processing module 140 has signal processing filters to look for specifically that pattern in those frequencies to identify both when a chirp signal is detected and what the distance is between the two mobile computing devices.

For some embodiments, as the video scene is being captured by the mobile computing device 100, the video stream is transmitted to the server computer 300 and analyzed by the server computer 300 for facial recognition. Alternatively, the identity of the desired user is transmitted to the server computer 300 and the images and different views are transmitted to the mobile computing device. Thus, the server computer 300 stores the photo's for facial recognition in the facial recognition database 340 and transmits to the mobile computing device 100 the facial recognition image/set of images front side, right side and left side profile to be matched with by the video processing module 135 making the facial recognition faster and easier by the video processing module 135 of the mobile computing device 100. It may be noted that, one or more types of rapid facial recognition software that looks at features such as skin tone, facial features such as eyes may be incorporated into the video processing module 135.

This process may be useful in large crowded public places such as in bar, sports arena or theme park, first time meet and greets, etc. The integration of audio based distance calculation and scene analysis allows the creation of dynamically formed mobile communities. The system creates mobile communities automatically, enabling users to connect to people with similar interests they would otherwise never have met. A user in the vicinity of someone with a similar profile will be alerted and given the directions to meet another user.

Although not shown, the mobile computing device 100 may include a power source (e.g., a battery), a subscriber identity module (8IM), a keyboard (although soft keyboard may be implemented), input/output interfaces (e.g., video, audio ports), external power connector, external memory connectors, an antenna, a speaker, etc. It should be noted that, although the mobile computing device 100 is used in the examples herein, non-mobile devices having similar features may also be used to transmit the visual information and to receive the augment information.

Network Environment with the Mobile Computing Devices and the Server Computers

FIG. 2 illustrates an example of a network that may be used to augment a captured video stream, in accordance with some embodiments. Network 200 may be an Internet. Multiple server computers 205A-205C and multiple mobile computing devices 210A-210D may be connected to the network 200. Each of the server computers 205A-205C may be associated with a database 206A-206C, respectively. The mobile computing devices 210A-210D may be referred to as the mobile computing devices. The network environment illustrated in this example may be referred to as the client-server environment. The client-server relationship allows the operations of the mobile computing device 205A-205C to be triggered anywhere in the world and to augment any captured video stream with useful information enhancing the user's view of the real world. It should be noted that the number of mobile computing devices, server computers, and databases illustrated in this example is for illustration purpose only and is not meant to be restrictive. It is within the scope of embodiments of the present invention that there may be many server computers and databases worldwide to serve many more mobile computing devices.

The mobile computing devices 210A-210D may include features similar to the mobile computing device 100 described in FIG. 1. The server computers 205A-205C may include communication modules and associated applications that allow them to be connected to the network 200 and to exchange information with the mobile computing devices 210A-210D. For example, a user using the mobile computing device 210A may interact with web pages that contain embedded applications, and then supply input to the query/fields and/or service presented by a user interface associated with the applications. The web pages may be served by the server computer 205A on the Hyper Text Markup Language (HTML) or wireless access protocol (WAP) enabled mobile computing device 205A or any equivalent thereof. The mobile computing device 205A may include browser software (e.g., Internet Explorer, Firefox) to access the web pages served by the server computer 205A.

Server Computer and Selection of the Augment Information

Figure 3A:
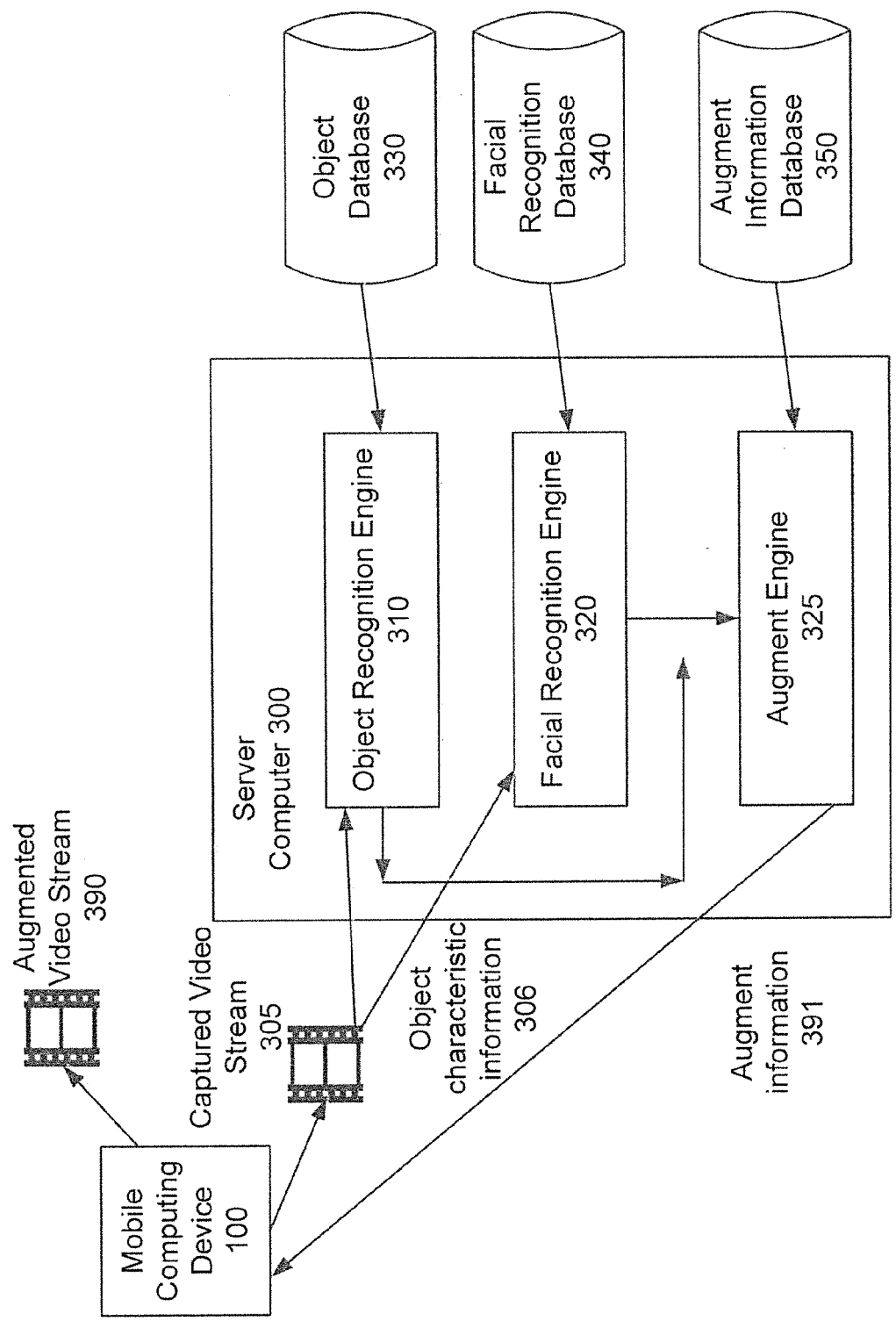
FIG. 3A illustrates an example of a server computer that may be used to determine augment information for used with a captured video stream, in accordance with some embodiments.

FIG. 3A illustrates an example of a server computer that may be used to determine augment information for use with a captured video stream, in accordance with some embodiments. Server computer 300 may include communication module (not shown) to allow it to be connected to a network such as the network 200 illustrated in FIG. 2. The server computer 300 may also include server applications that allow it to communicate with one or more mobile computing devices including, for example, the mobile computing device 100. Communication sessions may be established between the server computer 300 and the mobile computing device 100 to enable the receipt of the visual information 306 from the mobile computing device 100 and the transmission of the augment information 391 to the mobile computing device 100. For some embodiments, the server computer 300 may be coupled with object database 330, facial recognition database 340, and augment information database 350.

As discussed, the client module uses an extraction algorithm to identify the features of the points of interest in that frame, extracts those features along with data such as geographical information, compass direction, and other relevant information, and transmits that packet of information about that frame up to the IDOL server. The IDOL server has the knowledge base and distributed computing power to identify the point of interest. The IDOL server can analyze the series of frames coming in the video stream, and use this information to match the transmitted features of the points of interest to known objects or images in the database. At approximately at the same time as the object recognition engine 310 is hierarchically filtering or narrowing down the possible known matching images/object to the transmitted features, the augment engine 325 is preparing and selecting augment information to be transmitted back to the video processing module 135 on the mobile computing device 100 for display.

The augment engine 325 has a database of prepared augment information (e.g., video files, advertisements, links, etc.) to overlay onto known points of interest in the frames. The augment engine 325 narrows down the possible overlay to add into the video file based on potentially what is relevant to that user. The augment engine 325 can start transmitting to the mobile computing device 100 the potential large files such as video files, and advertisements while the object recognition engine 310 determines what object is. Otherwise the augment engine 325 can start transmitting the video files, and advertisements and images, textual messages, links to relevant web pages, etc. after the point of interest is identified. The video processing module 135 then overlays the augment information onto the frames of the video stream. The augment information may be a textual message or highlights of the points of interest. The user can choose to activate the highlighted point of interest to view the augment information associated with the frames of the video file being displayed on the display screen 106 of the mobile computing device 100.

The object database 330 may be configured to store information about a group of known objects. The information may describe the different characteristics of the known objects. This may include geographical information, color information, pattern information, and so on. In general, the characteristics of the object may include any information about the object that may be useful to identify the object and recognize it as a known object. For example, an office building located on the corner of Fourth Street and Broadway Avenue in downtown San Francisco may be identified based on its unique pyramid shape architecture and orange color. It may be noted that the object database 330 may be a large database when it is configured to store information about many objects or many groups of objects. Many techniques may be used to generate the information about the objects. For example, the information may be generated by human, or it may be generated by a special computer application coded to scan a color image and generate a list of objects included in the image along with their characteristics.

For some embodiments, the facial recognition database 340 may store facial recognition information for a group of known people. The facial recognition information for each person in the group may have previously been generated and stored in the facial recognition database 340. The facial recognition database 340 may be a large database when it is configured to store facial recognition information for many people. Many techniques may be used to generate and store the facial recognition information. For example, a person use a facial recognition application to generate own facial recognition information and request to have it stored in the facial recognition database 340.

For some embodiments, the augment information database 340 may be configured to store information that may be inserted into the captured video stream 305. The information may include identification information (e.g., the university), advertisement information (e.g., restaurant discount coupons), link information (e.g., a URL link to the website of a restaurant), facial information (e.g., Bob Smith), etc. Different types of augment information may be stored for the same object. For some embodiments, the server computer 300 may include an object recognition engine 310, a facial recognition engine 320, and an augment engine 325.

The object recognition engine 310 may be configured to receive the characteristics of the objects from the mobile computing device 100. The object recognition engine 310 can be configured to take advantage of distributed workload computing across multiple servers to increase the speed of filtering out known images stored in the object database 330 compared to the characteristics information transmitted by the video processing module 135. The object recognition engine 310 may use the geographical information included in the frames of the captured video stream 305 and the information stored in the object database 330 to recognize the objects. For example, the yellow building with the pyramid shape located at latitude coordinate X and longitude coordinate Y may be recognized as the National Financial Building. For some embodiments, the object recognition engine 310 may use a set of filters and apply the filters to the characteristics or visual information received from the mobile computing device 100 to determine whether it can recognize what the object or who the person is. Since the captured video stream 305 is comprised of a series of closely related frames both in time and in approximate location, the frames generally include the same objects and/or persons and the characteristics/visual information may have the same pattern of identified major features of the object (or the points of interest). This may help the object recognition engine 310 to narrow down the matching options that are available in the object database 330. For example, the object recognition engine 310 may recognize the distinctive features for the point of interest as a billboard or poster for a movie, a restaurant such as McDonalds, a building such as an office, historic landmark, residence, etc.

The facial recognition engine 320 may be configured to receive the facial characteristics of the persons from the mobile computing device 100. The facial recognition engine 320 may use the geographical information included in the frames of the captured video stream 305 and the information stored in the facial recognition database 340 to identify and recognize the persons. For some embodiments, the facial recognition engine 320 may also use the geographical information included in the frames to identify a location of the recognized person for direction purposes.

The augment engine 325 may be configured to receive the results from the object recognition engine 310 and/or the facial recognition engine 320 to determine how to select the proper augment information to be transmitted to the mobile computing device 100 to augment the identified object in the original video file, and select that augment information 391 from the augment information database 350. The augment information 391 may be related to the objects or persons that have been recognized by the object recognition engine 310 and/or the facial recognition engine 320. In general, the augment information 391 may include any information that may provide in-depth information or content about the objects and/or persons included in the frames of the captured video stream 305. For example, the augment information 391 may include listing of food establishments in various buildings, links to user reviews for a particular business, links to web pages, etc. The augment engine 325 may select the augment information that is most relevant to the user. For example, the object may be an office building with many different businesses, and the object database 330 may include augment information associated with each of the businesses. However, only the augment information associated with an art gallery may be selected because the profile of the user or the operator of the mobile computing device 100 may indicate that the user is only interested in modern arts.

The selected augment information 391 may then be transmitted to the mobile computing device 100 and used by the video processing module 135 to generate the augmented video stream 390. The augmented video stream 390 may then be viewed by the user or used by any other applications that may exist on the mobile computing device 100. It is within the scope of the embodiments of the invention that the operations of capturing the video stream, processing the captured video stream, recognizing object and/or persons in the captured video stream, augmenting the captured video stream, and presenting the augmented video stream to the user or the other applications occur in real time. For example, the user may capture a video stream 305 and almost instantaneously see the augmented video stream 390 displayed on the display screen 106 of the mobile computing device 100.

For some embodiments, the augment information may include graphical information and/or audio information. The graphical augment information may overlay the frames of the captured video stream 305. The audio augment information may be audible through the speaker 142 of the mobile computing device 100. Thus, the video processing module 135 on the mobile computing device 100 identifies major features of one or more points of interest within each frame of a video stream captured by the video camera 120, transmits those identified points of interest to the server computer 300, and displays the augment information overlaying the original captured video stream on the display screen 106 and/or output the audio portion of the augment information with the original captured video stream through the speakers 142 of the mobile computing device 100.

For some embodiments, the augment engine 325 may start transmitting potentially large augment information 391 (e.g., video files, advertisements, images, etc.) while the object recognition engine 310 and/or the facial recognition engine 320 are identifying the objects. Otherwise, the augment engine 325 may start transmitting the augment information 391 after the points of interest and the objects are identified. The video processing module 135 may then overlay the augment information onto the video stream. For some embodiments, the user may have the option to view the captured video stream as is, or the user may select to view the corresponding augmented video stream.

Figure 7:
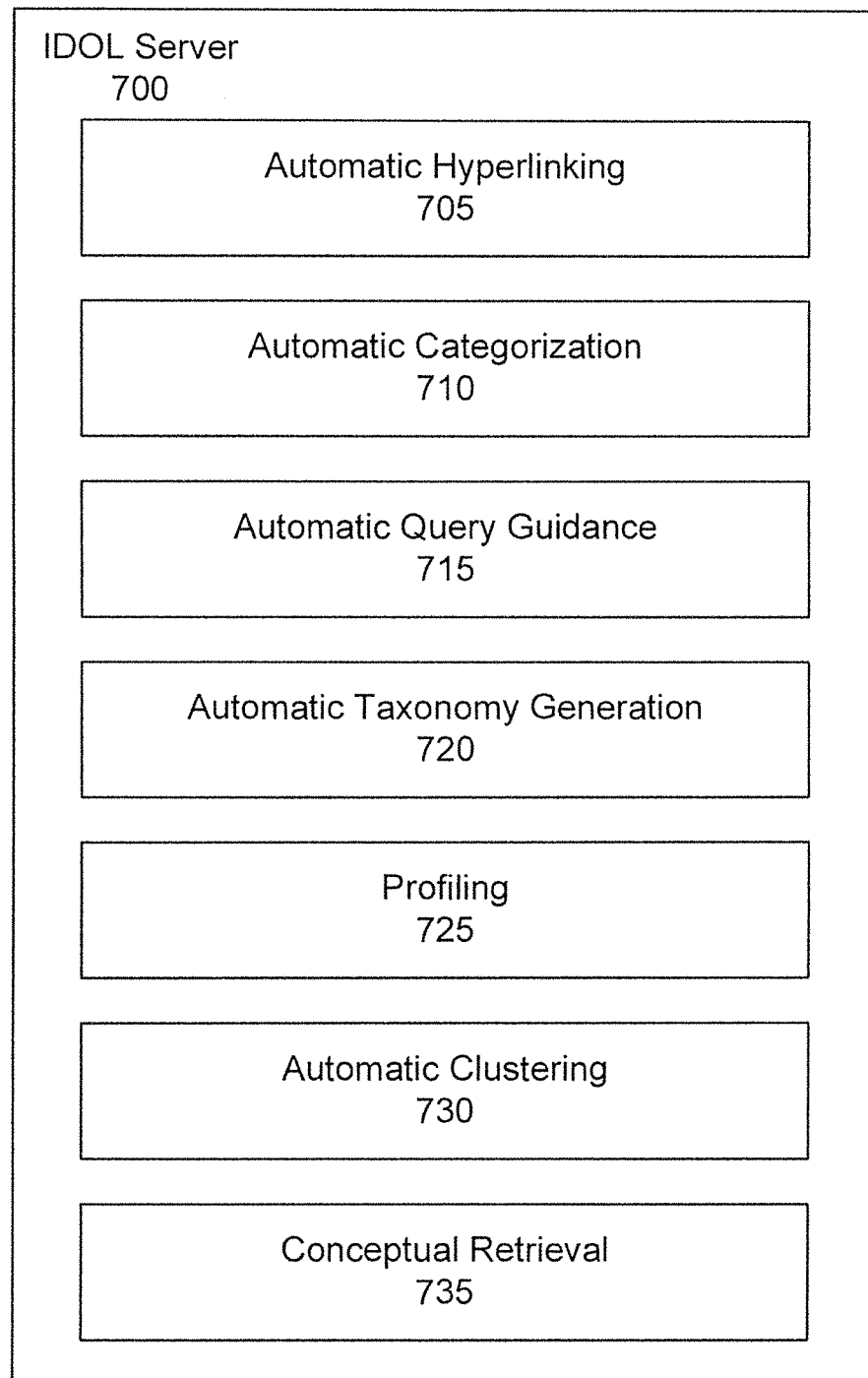
FIG. 7 illustrates an example block diagram of some modules of an IDOL server, in accordance with some embodiments.

For some embodiments, the server computer 300 may be implemented as an Intelligent Data Operating Layer (IDOL) server using the IDOL software product and associated system of Autonomy Corporation of San Francisco, Calif. The IDOL server collects indexed data from connectors from various sources to train the engines and stores it in its proprietary structure, optimized for fast processing and retrieval of data. As the information processing layer, IDOL forms a conceptual and contextual understanding of all content in an enterprise, automatically analyzing any piece of information from over thousands of different content formats and even people's interests. Hundreds of operations can be performed on digital content by IDOL, including hyperlinking, agents, summarization, taxonomy generation, clustering, education, profiling, alerting and retrieval. The IDOL Server has the knowledge base and interrelates the feature pattern being transmitted by the video processing module 135. An example of the modules included in the IDOL server is illustrated in FIG. 7.

The IDOL server enables organizations to benefit from automation without losing manual control. This complementary approach allows automatic processing to be combined with a variety of human controllable overrides, offering the best of both worlds and never requiring an "either/or" choice. The IDOL server integrates with all known legacy systems, eliminating the need for organizations to cobble together multiple systems to support their disparate component.

The IDOL sever may be associated with an IDOL connector which is capable of connecting to hundreds of content repositories and supporting over thousands of file formats. This provides the ability to aggregate and index any form of structured, semi-structured and unstructured data into a single index, regardless of where the file resides. The extensive set of connectors enables a single point of search for all enterprise information (including rich media), saving organizations much time and money. With access to virtually every piece of content, IDOL provides a 360 degree view of an organization's data assets.

The IDOL servers implement a conceptual technology is context-aware and uses deep audio and video indexing techniques to find the most relevant products, including music, games and videos. The IDOL servers categorize content automatically to offer intuitive navigation without manual input. The IDOL servers also generate links to conceptually similar content without the user having to search. The IDOL servers may be trained with free-text descriptions and sample images such as a snapshot of a product. A business console presents live metrics on query patterns, popularity, and click-through, allowing the operators to configure the environment, set-up promotions and adjust relevance in response to changing demand.

For some embodiments, the video processing module 135 of the mobile computing device 100 may identify the characteristics of the objects and/or persons and then causes that information to be transmitted to an IDOL server in real time. Thus, it is possible that while the augment engine 325 of the server computer 300 performing its operations for a first set of frames, the video processing module 135 of the mobile computing device 100 may be performing its operations for a second set of frames, and a third set of frames along with the associated augment information may be displayed on the display screen 106.

User Profile Information and Selection of Relevant Augment Information

Figure 3B:
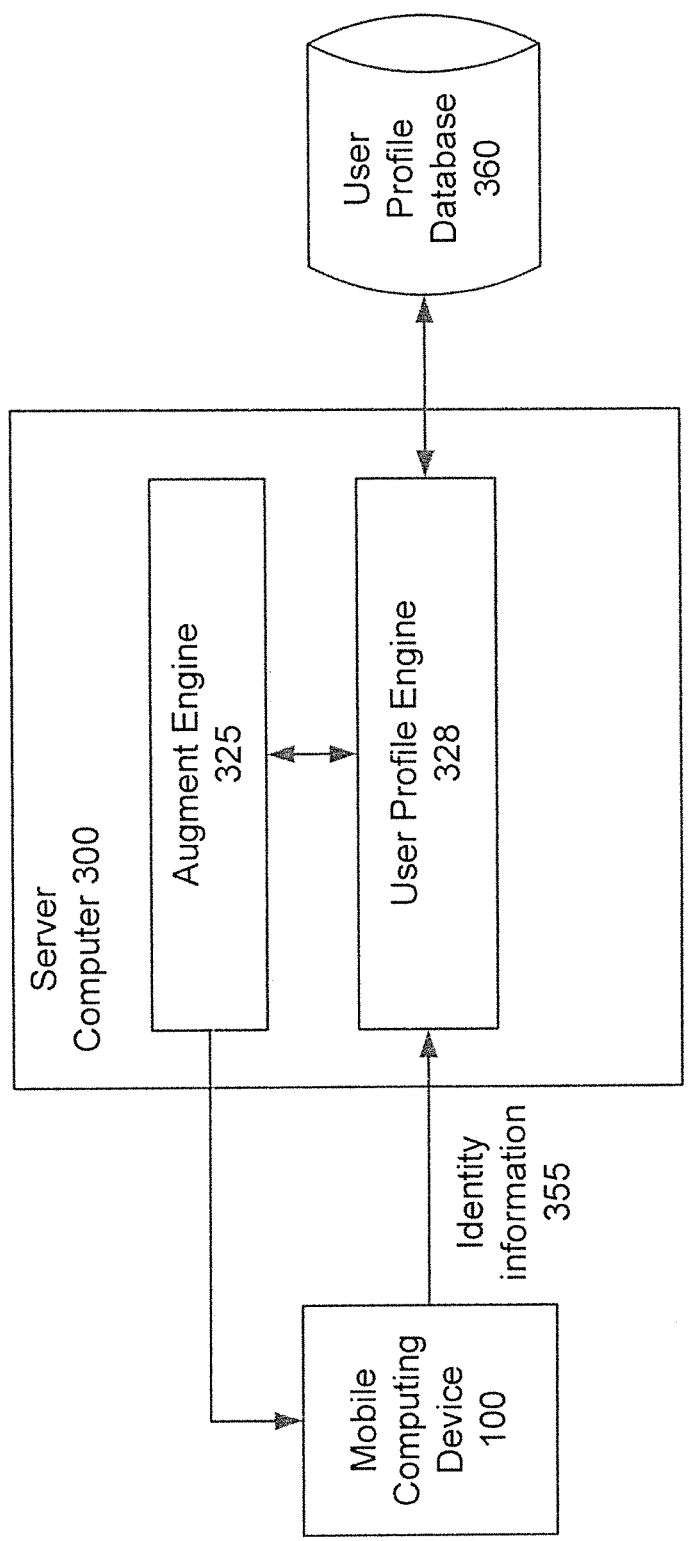
FIG. 3B illustrates an example of user profile information, in accordance with some embodiments.

FIG. 3B illustrates an example of a server computer that may be used to determine augment information for use with a captured video stream, in accordance with some embodiments. The components included in the server computer 300 may be in addition to the components illustrated in FIG. 3A. This includes the user profile engine 328 and user profile database 360. The server computer 300 may augment identified points of interest within each frame of a video stream with augment information on those points of interest that is more relevant to the user of the specific mobile computing device hosting the video processing module 135 by maintaining a user profile.

For some embodiments, the system described herein augments each identified points of interest within each frame of a video stream with the augment information (graphical or audio information) on those points of interest that is more relevant to the user of the specific mobile computing device hosting the video processing application 135. The types of augment information that can be supplied are stored in the augment information database 350. The server computer 300 uses the mobile computing device's user-specific information in the process of selecting the augment information to be used with the video stream.

The video processing module 135 captures the user's habits when the user uses mobile computing device 100. For example, the user's habit may be captured when the user is capturing a video stream, browsing the Internet, dialing phone numbers, etc. The information may include phone numbers typically called, websites frequency visited, types of products purchased, user's age and gender, home city and address information, etc. The use of user-specific information, as well as the ability to automatically update and refine the information over time, are essential for accurate delivery and targeting of the augment information and differentiate the technique from all predecessors.

The video processing module 135 transmits a combination of the features of the points of interest visual information to the server computer 300, along with a user's individual profile, and a number of additional pieces of information to the server computer 300. The server computer 300 then determines the augment information for the frames of the video stream 305 with information of specific relevance to that user at that position and time. The user-specific's aspects can automatically train and update a user profile of that user which allows the delivery of more pertinent information. As each user utilizes the system of augmenting the video stream, the information on his usage is used to build a "profile" to represent his interests, demographics, and/or specific patterns of use. Subsequently, the user's mobile computing device 100 can be deployed to collect information and the video stream from the video camera and transmit the collected information to the server computer 300. This is used to determine the most pertinent augmentations that can be made to the system for that user at that specific time, and augment the video stream 305 with additional visual or audiovisual objects or images.

The user profile database 360 is maintained to represent each user's interests, demographics, and/or specific patterns of use, which can be referenced by the user profile engine 328 and the augment engine 325 when determining what type of augment information to augment a point of interest in the frame of the captured video stream on the mobile computing device 100. The augment engine 325 may have a set of for example, twenty or more, different ways to augment points of interest whether general augment information that applies to a category of known objects such as a chain restaurant or specific-content augment information that applies to only to the known object as well as different subject matter in the augment information from advertisements to historical points of interest, links to relevant web pages, overlays of street addresses, phone numbers, list of shops in a building, to enhancements such as animations created to enhance that object.

The user profile engine 328 assists the augment engine 325 in determining which augment information to select and transmit to the mobile computing device 100 to be added to the frames of the video stream being captured by the mobile computing device 100. In an embodiment, the IDOL server system may automatically profile the way the users interact with each other and with information on their mobile computing devices, build a conceptual understanding of their interests and location to deliver tailored commercial content. The IDOL server provides automatic notification as soon as new tracks and relevant products are released, or location-specific information such as traffic reports and up-to-the-minute news, without the user having to search.

Server Mirroring and Distributed Processing

Figure 4:
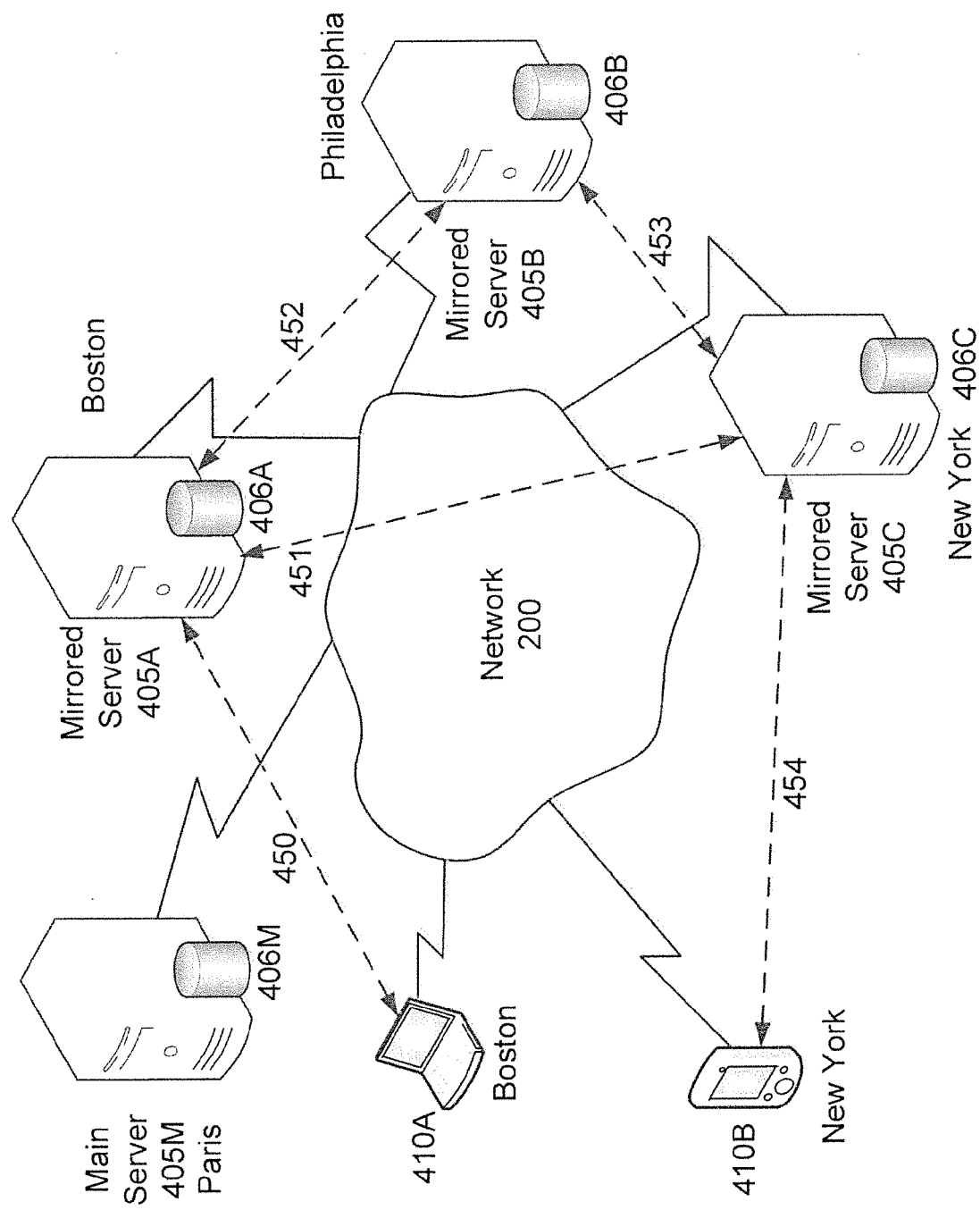
FIG. 4 illustrates an example of a network diagram with mirrored servers that may be used to filter information received from the mobile computing devices, in accordance with some embodiments.

FIG. 4 illustrates an example of a network diagram with mirrored servers that may be used to filter information received from the mobile computing devices, in accordance with some embodiments. Server computers 405M, 405A, 405B, and 405C connected to the network 200 may be configured as IDOL servers. The IDOL servers may include a main IDOL server 405M and multiple mirrored IDOL servers 405A-405C. The main IDOL server 405M may mirror its information onto the mirrored IDOL servers 405A-405C. The mirroring may include mirroring the content of the main IDOL server database 406M into the mirrored IDOL sever databases 406A-406C. For example, the object database 300, the facial recognition database 340, and the augment information database 350 may be mirrored across all of the mirrored IDOL servers 405A-405C. The main IDOL server 405M and the mirrored IDOL servers 405A-405C may be located or distributed in various geographical locations to serve the mobile computing devices in these areas. For example, the main IDOL server 405M may be located in Paris, the mirrored IDOL server 405A may be located in Boston, 405B in Philadelphia, and 405C in New York.

Each of the IDOL servers illustrated in FIG. 4 may include its own object recognition engine 310, facial recognition engine 320, and augment engine 325. The distribution of servers within a given location helps to improve the identification and augmentation response time. The mirroring of identical server site locations also helps to improve the identification and augmentation response time. However, in addition mirroring of identical server site locations aids in servicing potentially millions of mobile computing devices with the video application resident all submitting packets with distinguishing features for the points of interest by distributing the workload and limiting the physical transmission distance and associated time. The IDOL server set being duplicated with the same content and mirrored across the Internet to distribute this load to multiple identical sites to increase both response time and handle the capacity of the queries by those mobile computing devices.

For some embodiments, the video processing module 135 may include a coded block to call up and establish a persistent secure communication channel with a nearest non-overloaded mirrored site of the main IDOL server when the mobile computing device 100 is used to capture a video stream. For example, the mobile computing device 410A may be connected with the IDOL server 405A via communication channel 450 because both are located in Boston. However, when the IDOL server 405A is overloaded, the mobile computing device 410A may be connected with the IDOL server 405C in New York because it may not be overloaded even though the IDOL server 405C may be further from the mobile computing device 410A than the IDOL server 405A.

For some embodiments, a set of IDOL servers may be used to filter the information received from the mobile computing devices. A hierarchical set of filters may be spread linearly across the set of IDOL servers. These IDOL servers may work together in collaboration to process the transmitted object and/or person visual information to determine or recognize what the object or who the person is. For example, when the mobile computing device 410A establishes the communication channel 450 with the IDOL server 405A, the IDOL servers 405A-405C may work together to process the information received from the mobile computing device 410A. This collaboration is illustrated by the communication channel 451 between the IDOL server 405A and 405C, and the communication channel 452 between the IDOL server 405A and 405B. Similarly, when the mobile computing device 410B establishes communication channel 454 with the IDOL server 405C, the IDOL servers 405C, 405B and 405A may work together to process the information received from the mobile computing device 410B. This collaboration is illustrated by the communication channel 451 between the IDOL server 405C and 405A, and the communication channel 453 between the IDOL server 405C and 405B.

Each server in the set of servers applies filters to eliminate the pattern of features received from the mobile computing device 100 as possible matches to feature sets of known objects in the object database 330. Entire categories of possible matching objects can be eliminated simultaneously, while subsets even within a single category of possible matching objects can be simultaneously solved for on different servers. Each server may hierarchically rule out potentially known images on each machine to narrow down the hierarchical branch and leaf path to a match or no match for the analyzed object of interest.

The mobile computing device 100 has built-in Wi-Fi circuitry, and the video stream is transmitted to an IDOL server on the Internet. The IDOL server set contains an object recognition engine 310 distributed across the IDOL server set, IDOL databases, and an augment engine 325 as well. The object recognition engine 310 distributed across the IDOL server set applies a hierarchical set of filters to the transmitted identified points of interest and their associated major within each frame of a video stream to determine what that one or more points of interest are within that frame. Since this is a video feed of a series of closely related frames both in time and in approximate location, the pattern of identified major features of points of interest within each frame of a video stream helps to narrow down the matching known object stored in the object database 330.

The collaboration among the IDOL servers may help speed up the recognition process. For example, each of the IDOL servers may apply filters to eliminate certain pattern of features as possible matches to features of known objects stored in the object database 330. Entire categories of objects may be eliminated simultaneously, while subsets even within a single category of objects may be simultaneously identified as potential matching objects by the collaborating IDOL servers. Each IDOL server may hierarchically rule out potential known objects to narrow down the hierarchical branch and leaf path to determine whether there is a match.

For some embodiments, each of the IDOL servers may match the pattern of the visually distinctive features of the points of interest in the frame to the known objects in the object database 330. The geometric shape of the features of the point of interest X-V coordinates may come across to a human like a dot-to-dot connection illustration. When the X-V coordinates of the dots on the grid of the paper are connected in the proper sequence, recognizing the image/object associated with those dots on the piece of paper is a simple task. This may include comparing the dot-to-dot type geometric shapes transmitted features along with their distinctive colors, recognized text, numbers and symbols, geographical information, direction information relative to the camera to the feature sets stored in the object database 330. The dot-to-dot type geometric shapes can be subset into distinctive triangles, pyramids, rectangles, cubes, circles and cylinders, etc., each with its own associated distinctive colors or patterns, to aid in the identification and recognition. Each of the IDOL servers, on a hierarchical basis, may map the collection of feature points about the points of interest to a stored pattern of feature points for known objects to match what's in the frames to the known object.

For some embodiments, the video processing module 135 may continuously transmit the identified features of the points of interest 306 in the frames of the captured video stream 305 while the object recognition engine 310 (distributed over a large amount of IDOL servers) and augment engine 325 transmits back the augment information to augment identified images/objects in the captured frames of the video file stored in a memory of the mobile computing device 100 when that identified object is being shown on the display in near real time (e.g., less than 5 seconds).

As discussed, the server computer 300 has a set of one or more databases to store a scalable database of visual information on locations such as buildings, and structures, in order to perform subsequent matching of a visual data stream to determine the building or structure that is being viewed. The server-client system addresses the problem of determining the exact location of a mobile user, and to determine exactly what the user is looking at, at any point, by matching it against a database of characteristics associated with those visual images. The system gives the ability to construct a scalable solution to the problem to identify location, regardless of position and with minimal training.

The system with the server computer 300 and a set of one or more databases (e.g., object database 330, facial recognition database 340, augment information database 350, user profile database 360) is trained on a set of views of the world and the models derived are stored for future retrieval. The combination of geographical information and visual characteristics allows a faster matching. Following this, the mobile computing device can be deployed to collect geospatial information and a video data stream from the camera and feed it back to the system. This is used to pinpoint the objects or locations within view and augment the video stream with additional visual or audiovisual objects or images.

Flow Diagrams

Figure 5:
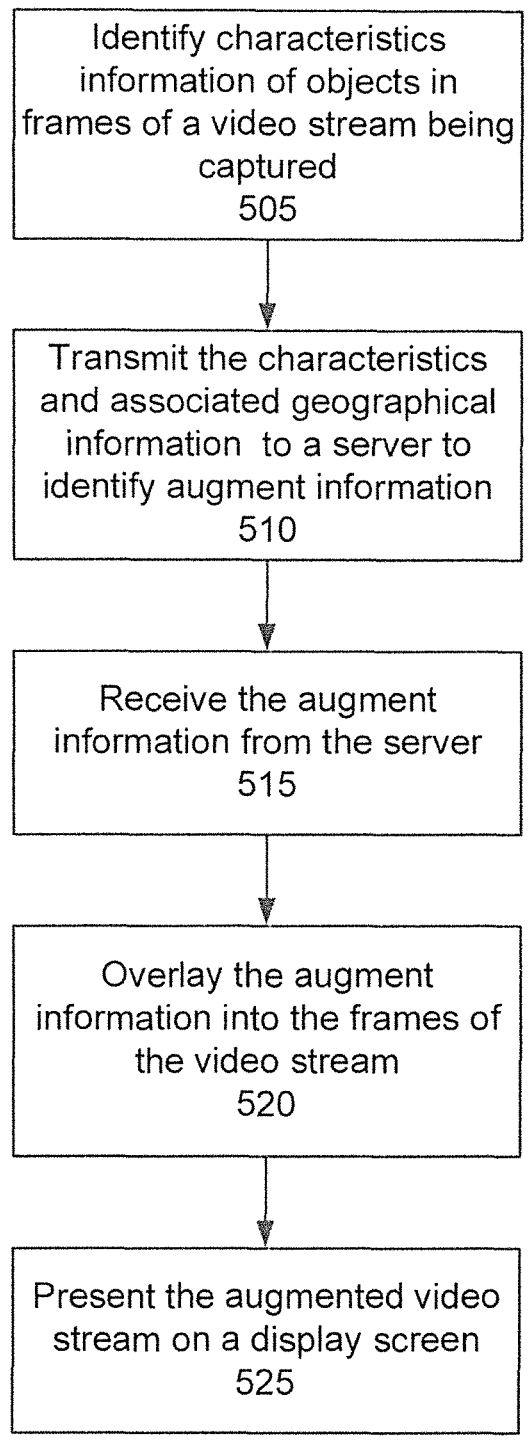
FIG. 5 illustrates an example flow diagram of a process that may execute on a mobile computing device to create an augmented video stream, in accordance with some embodiments.

FIG. 5 illustrates an example flow diagram of a process that may execute on a mobile computing device to create an augmented video stream, in accordance with some embodiments. The process may be associated with operations that may be performed on the mobile computing device 100. The mobile computing device 100 may be capturing many frames of a video stream. As the frames are being captured, they are analyzed and characteristics information of objects in the frames is extracted, as shown in block 505. The extraction may involve the features, the geometric shape information, the distinct colors, the dot-to-dot type pattern, and other relevant information. The extraction may involve generating a pattern of X-V coordinates of the geometric shapes of the point of interest and the color associated with the shapes, and the geographic coordinates from the GPS modules, the direction information from the direction sensor 122 associated with the video camera 121 of the mobile computing device.

At block 510, the characteristics information and geographical information are transmitted to a server computer (e.g., server computer 300) in a network so that the server computer can filter the information and determine the augment information. The server computer that receives the characteristics information may be one that is geographically closest to the mobile computing device 100. If this server computer is overloaded, a nearby non-overloaded server computer may be selected instead. The selected server computer may collaborate with other mirrored server computers to determine the augment information. The server computers may perform comparing and matching operations using a hierarchical approach. The server computers may find different augment information that may be used. Criteria may be used to select the appropriate augment information to transmit to the mobile computing device 100.

At block 515, the augment information is received from the server computer. It may be possible that while the mobile computing device 100 is receiving the augment information for a series of frames, the mobile computing device 100 is also preparing characteristics information for another series of frames to be transmitted to the server computer. In general, for each frame in the video stream, a transmission packet containing the characteristics information of the point(s) of interest is transmitted to the server computer from the mobile computing device 100.

At block 520, the mobile computing device 100 may use the augment information to overlay the appropriate frames of the video stream and create an augmented video stream. At bloc 525, the augmented video stream is displayed on the display screen 106 of the mobile computing device 100.

Figure 6A:
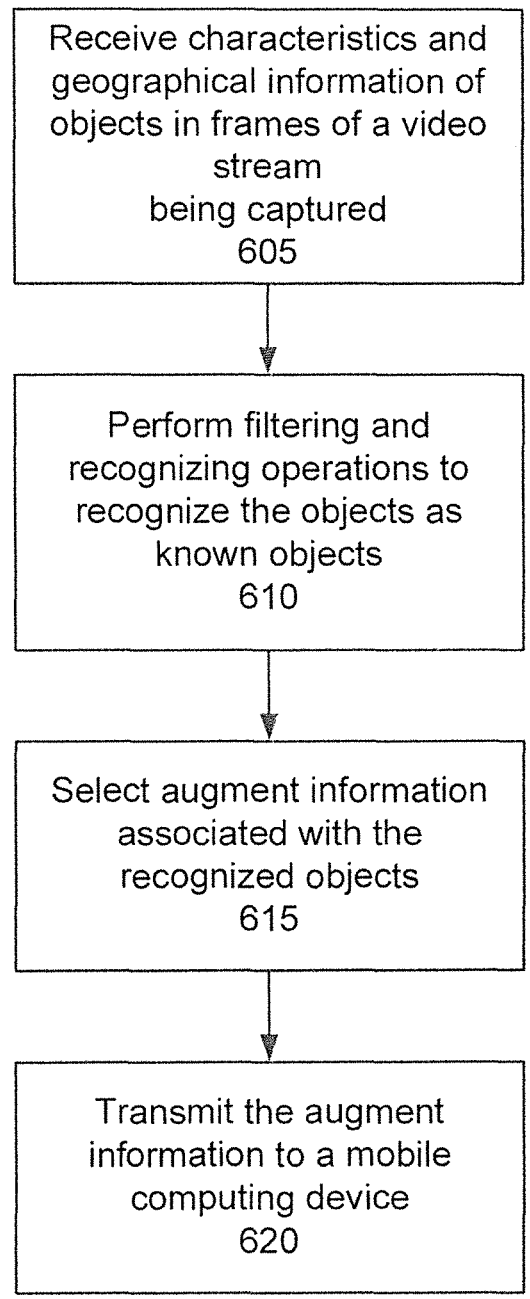
FIG. 6A illustrates an example flow diagram of a process that may execute on a server computer to determine augment information, in accordance with some embodiments.

FIG. 6A illustrates an example flow diagram of a process that may execute on a server computer to determine augment information, in accordance with some embodiments. The operations associated with this process may be performed by many servers working collaboratively to provide the results to the mobile computing device in almost real time. The process may start at block 605 where the characteristics and geographical information are received from the mobile computing device 100. Direction information of the video camera 121 may also be received from the direction sensor 122. As mentioned earlier, the information transmitted from the mobile computing device 100 may be compressed. As such, the server may include decompression logic to decompress the information. The server may also include compression logic to compress the augment information if necessary. At block 610, the servers may perform comparing and matching or recognition operations. This may include filtering and eliminating any known objects that do not possess the same characteristics. This may include narrowing down to potential known objects that may possess the same characteristics.

It may be possible that there is a set of augment information for each known object, and the server may need to determine which augment information to select, as shown in block 615. At block 620, the augment information is transmitted to the mobile computing device 100. It may be possible that while the server is transmitting the augment information for a set of frames of a video stream, the server is also performing the operations in block 610 for another set of frames associated with the same video stream. It may be noted that the processes described in FIG. 5 and FIG. 6A may also be used to perform facial recognition using the facial recognition engine 320 and the facial recognition database 340.

Figure 6B:
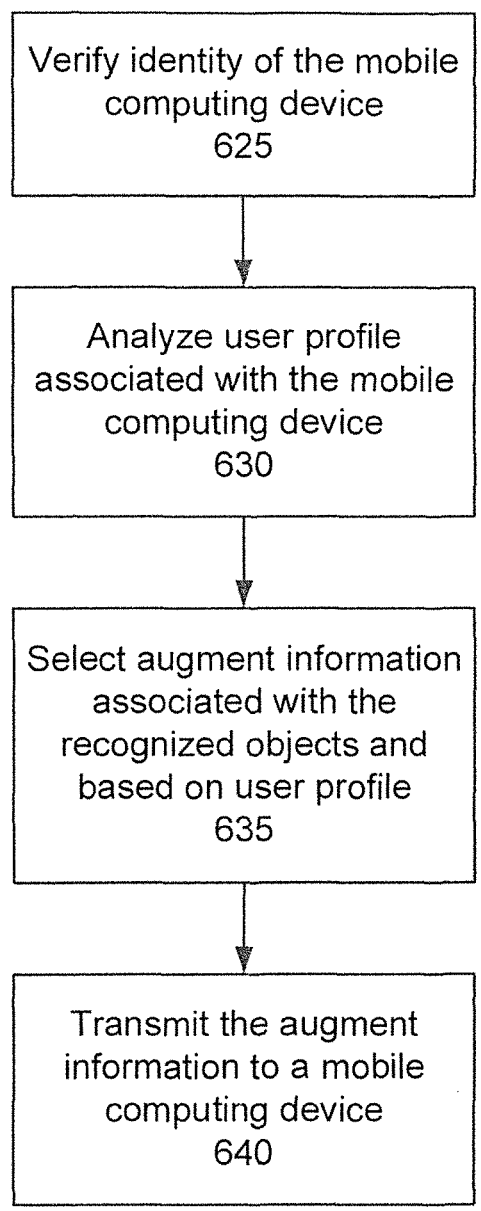
FIG. 6B illustrates an example flow diagram of a process that may execute on a server computer to determine augment information based on user profile, in accordance with some embodiments.

FIG. 6B illustrates an example flow diagram of a process that may execute on a server computer to determine augment information based on user profile, in accordance with some embodiments. The operations associated with this process may be performed by an IDOL server and may expand on the operations described in block 615 of FIG. 6A. The process may start at block 625 where the identity of the mobile computing device 100 is verified. The identity information of the mobile computing device 100 may have been transmitted to the server computer 300 during the initial communication such as, for example, during the establishing of the communication channel between the mobile device 100 and the server computer 300. The identity information may be used by the user profile engine 328 to determine the appropriate user profile from the user profile database 360, as shown in block 630. As discussed, the user profile may have been collected as the mobile computing device 100 is used by the user over time. The user profile may include specific user-provided information. At block 635, the augment information may be selected based on the information in the user profile. This allows relevant augment information to be transmitted to the mobile computing device 100 for augmentation of the video stream 305, as shown in block 640.

Figure 6C:
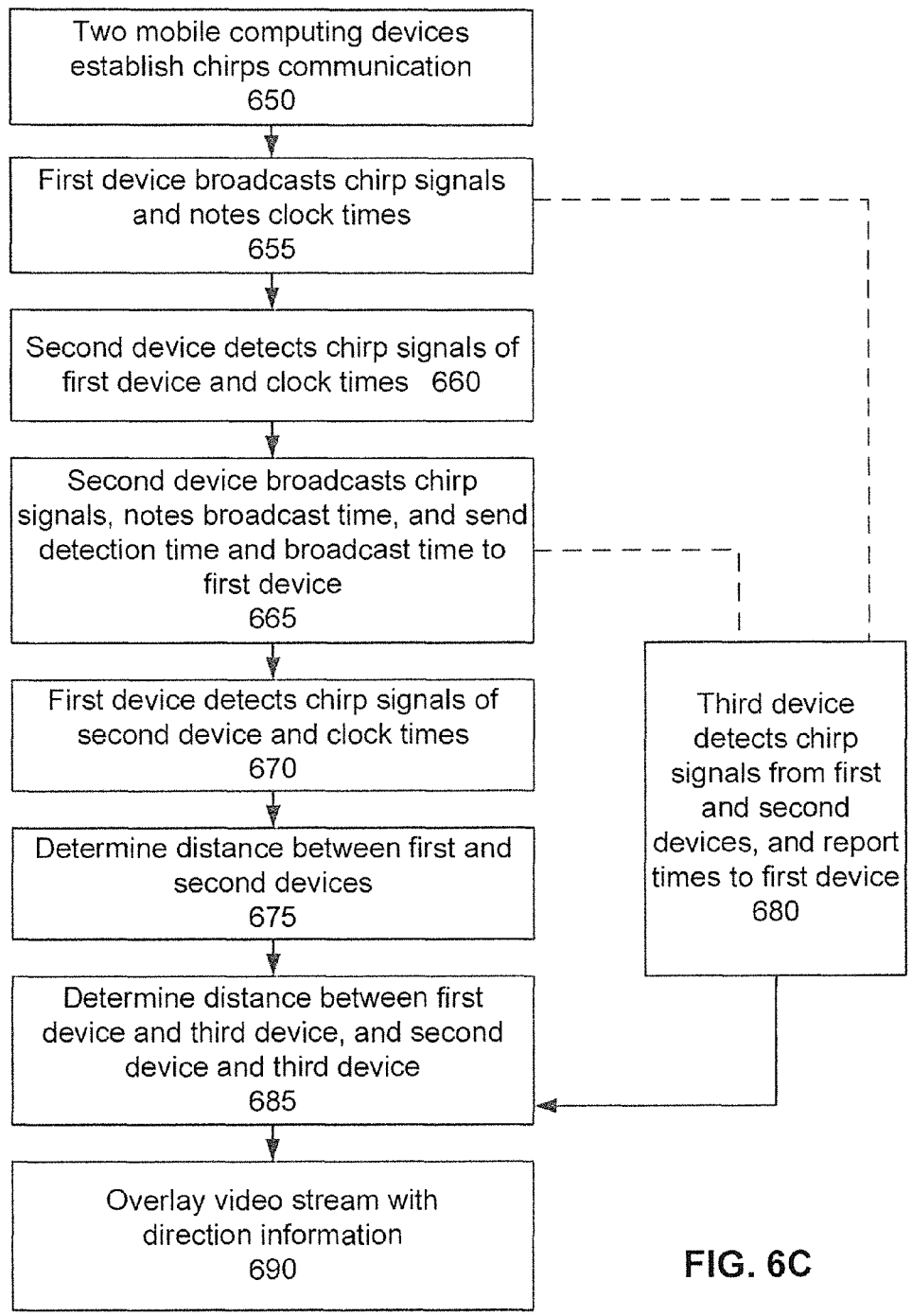
FIG. 6C illustrates an example flow diagram of a process that may be used to determine distance based on the chirp signals generated by the mobile computing devices, in accordance with some embodiments.

FIG. 6C illustrates an example flow diagram of a process that may be used to determine distance based on the chirp signals generated by the mobile computing devices, in accordance with some embodiments. The process may operate after the facial recognition operations by the facial recognition engine 320 have been performed and positive recognition has occurred. The process may start at block 650 where the two mobile computing devices make initial chirp communication. At block 655, the first mobile computing device broadcasts the chirp signal a predetermined number of times (e.g., three times) and notes the clock times at which they were broadcast. At block 660, the second mobile computing device records an audio signal and detects the chip signals and their clock times. At block 665, the procedure is reversed after a few seconds of pause (e.g., five (5) seconds) when the second mobile computing device broadcasts its chirp signal for the same predetermined number of times. The second device then notes its broadcast time, and sends detection time and broadcast time to the first device. At block 670, the first mobile computing device detects the chirp signals of the second mobile computing device in its recorded audio signal. At block 675, from the first mobile computing device, a first formula is used to determine the distance between the two mobile computing devices based on the measured clock times.

At block 680, a third mobile computing device listening to the two chirp signal broadcasts by the first and second mobile computing devices also detects them in its recorded audio signal and reports the times to the first mobile computing device. The third mobile computing device may be placed in a pre-determined location. At block 685, from the first mobile computing device, a second formula is used to calculate the position (x, y) of the second mobile computing device with respect to itself and the third mobile computing device and triangulates the position and distance among all three mobile computing devices. At block 690, the video processing module 135 of the first and second mobile computing devices then overlays arrows or footsteps on the video stream being displayed on each respective display screen to indicate which direction each user of the first and second mobile computing device should proceed in to meet up. Thus, a combination of scene analysis, facial recognition, and subsequence audio signal is used to detect and determine a spatially-accurate location of one or more mobile computing devices Intelligent Data Operating Layer (IDOL) Server FIG. 7 illustrates an example block diagram of some modules of an IDOL server, in accordance with some embodiments. IDOL server 700 may include automatic hyperlinking module 705, automatic categorization module 710, automatic query guidance module 715, automatic taxonomy generation module 720, profiling module 725, automatic clustering module 730, and conceptual retrieval module 735. The automatic hyperlinking module 705 is configured to allow manual and fully automatic linking between related pieces of information. The hyperlinks are generated in real-time at the moment the document is viewed. The automatic categorization module 710 is configured to allow deriving precise categories through concepts found within unstructured text, ensuring that all data is classified in the correct context.

The automatic query guidance module 715 is configured to provide query suggestions to find most relevant information. It identifies the different meanings of a term by dynamically clustering the results into their most relevant groupings. The automatic taxonomy generation module 720 is configured to automatically generate taxonomies and instantly organizes the data into a familiar child/parent taxonomical structure. It identifies, names and creates each node based on an understanding of the concepts with the data set as a whole. The profiling module 725 is configured to accurately understand individual's interests based on their browsing, content consumption and content contribution. It generates a multifaceted conceptual profile of each user based on both explicit and implicit profiles.

The automatic clustering module 730 is configured to help analyze large sets of documents and user profiles and automatically identify inherent themes or information clusters. It even cluster unstructured content exchanged in emails, telephone conversations and instant messages. The conceptual retrieval module 735 is configured to recognize patterns using a scalable technology that recognizes concepts and find information based on words that may not be located in the documents. It should be noted that the IDOL server 700 may also include other modules and features that enable it to work with the mobile computing device 100 to generate the augmented video stream as described herein. As described above, one or more of the modules of the IDOL server 700 may be used to implement the functionalities of the object recognition engine 310, the facial recognition engine 320, the augment engine 325, and the user profile engine 328.

Computer System

FIG. 8 illustrates an example computer system that may be used to implement an augmented video stream, in accordance with some embodiments. Computing environment 802 is only one example of a suitable computing environment and is not intended to suggest any limitations as to the scope of use or functionality of the embodiments of the present invention. Neither should the computing environment 802 be interpreted as having any dependency or requirement relating to anyone or combination of components illustrated in FIG. 8.

Embodiments of the invention may be operational with general purpose or special purpose computer systems or configurations. Examples of well-known computer systems that may be used include, but are not limited to, personal computers, server computers, hand-held or laptop devices, Tablets, Smart phones, Netbooks, multiprocessor systems, microprocessor-based systems, set top boxes, programmable consumer electronics, network PCs, minicomputers, mainframe computers, distributed computing environments that include any of the above systems or devices, and the like.

Embodiments of the present invention may be described in the general context of computer-executable instructions, such as program modules, being executed by a computer system. Generally, program modules include routines, programs, databases, objects, components, data structures, etc. that performs particular tasks or implement particular abstract data types. Those skilled in the art can implement the description and/or figures herein as computer-executable instructions, which can be embodied on any form of computer readable media discussed below.

Embodiments of the present invention may also be practiced in distributed computing environments where tasks are performed by remote processing devices that are linked through a communications network. In a distributed computing environment, program modules may be located in both local and remote computer storage media including memory storage devices.

Referring to FIG. 8, the computing environment 802 includes a general purpose computer system 810. Components of the computer system 810 may include, but are not limited to, a processing unit 820 having one or more processing cores, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

Computer system 810 typically includes a variety of computer readable media. Computer readable media can be any available media that can be accessed by computer system 810 and includes both volatile and nonvolatile media, removable and non-removable media. By way of example, and not limitation, computer readable mediums uses include storage of information such as computer readable instructions, data structures, program modules or other data. Computer storage mediums include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer system 810. Communication media typically embodies computer readable instructions, data structures, program modules or other transport mechanism and includes any information delivery media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer system 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer system 810 may also include other removable/nonremovable volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer system 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. The operating system 844, the application programs 845, the other program modules 846, and the program data 847 are given different numeric identification here to illustrate that, at a minimum, they are different copies.

A participant may enter commands and information into the computer system 810 through input devices such as a keyboard 862, a microphone 863, and a pointing device 861, such as a mouse, trackball or touch pad. Other input devices (not shown) may include a joystick, game pad, scanner, or the like. These and other input devices are often connected to the processing unit 820 through a user input interface 860 that is coupled with the system bus 821, but may be connected by other interface and bus structures, such as a parallel port, game port or a universal serial bus (USB). A monitor 891 or other type of display device is also connected to the system bus 121 via an interface, such as a video interface 890. In addition to the monitor, computers may also include other peripheral output devices such as speakers 897 and printer 896, which may be connected through an output peripheral interface 890.

The computer system 810 may operate in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer system 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer system 810 is connected to the LAN 871 through a network interface or adapter 870. When used in a WAN networking environment, the computer system 810 typically includes a modem 872 or other means for establishing communications over the WAN 873, such as the Internet. The modem 872, which may be internal or external, may be connected to the system bus 821 via the user-input interface 860, or other appropriate mechanism. In a networked environment, program modules depicted relative to the computer system 810, or portions thereof, may be stored in a remote memory storage device. By way of example, and not limitation, FIG. 8 illustrates remote application programs 885 as residing on remote computer 880. It will be appreciated that the network connections shown are exemplary and other means of establishing a communications link between the computers may be used.

It should be noted that some embodiments of the present invention may be carried out on a computer system such as that described with respect to FIG. 8. However, some embodiments of the present invention may be carried out on a server, a computer devoted to message handling, handheld devices, or on a distributed system in which different portions of the present design may be carried out on different parts of the distributed computing system.

Another device that may be coupled with the system bus 821 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 872 may employ a Wireless Application Protocol (WAP) to establish a wireless communication channel. The communication module 872 may implement a wireless networking standard such as Institute of Electrical and Electronics Engineers (IEEE) 802.11 standard, IEEE std. 802.11-1999, published by IEEE in 1999.

Examples of mobile computing devices may be a laptop computer, a tablet computer, Netbook, cell phone, a personal digital assistant, or other similar device with on board processing power and wireless communications ability that is powered by a Direct Current (DC) power source that supplies DC voltage to the mobile computing device and that is solely within the mobile computing device and needs to be recharged on a periodic basis, such as a fuel cell or a battery.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. For example, specific examples are provided for shapes and materials; however, embodiments include those variations obvious to a person skilled in the art, such as changing a shape or combining materials together. Further, while some specific embodiments of the invention have been shown the invention is not to be limited to these embodiments. For example, several specific modules have been shown. Each module performs a few specific functions. However, all of these functions could be grouped into one module or even broken down further into scores of modules. Most functions performed by electronic hardware components may be duplicated by software emulation and vice versa. The invention is to be understood as not limited by the specific embodiments described herein, but only by scope of the appended claims.

What is claimed is:

1. A computing device comprising:
a video camera to capture a video stream;
a display screen to display the captured videos stream;
a processor; and
a memory on which is stored machine readable instructions that are to cause the processor to:
   access the video stream captured by the video camera;
   extract features of points of interest in frames of the captured video stream;
   relate patterns from a series of two or more of the frames to reduce an amount of points of interest in the frames that the server computer is to use in identifying the augment information;
   transmit the extracted features of the points of interest and the related patterns to a server computer that is to use the extracted features of the points of interest to identify augment information;
   receive the augment information from the server computer;
   augment the captured video stream with the augment information to generate an augmented video stream; and
   display the augmented video stream on the display screen.

2. The computing device according to claim 1:
wherein the machine readable instructions are further to cause the processor to:
generate geographical information associated with the frames of the video stream; and
transmit the geographical information to the server computer, wherein the server computer is to use the extracted features of the points of interest and the geographical information to identify the augment information.

3. The computing device according to claim 1, wherein the augment information is related to the points of interest in the frames.

4. The computing device according to claim 1, wherein the features of the points of interest comprise geometrical shapes associated with the points of interest and color associated with each of the geometrical shapes, and wherein each of the geometrical shapes is associated with a pattern of X-Y coordinates.

5. The computing device according to claim 4, further comprising:
a direction sensor coupled with the video camera, wherein the video camera is to sense direction information of the video camera; and
wherein the machine readable instructions are further cause the processor to transmit the direction information of the video camera to the server computer.

6. The computing device according to claim 5, wherein the machine readable instructions are further to compress the extracted features of points of interest and the direction information prior to transmission of the extracted features of points of interest and the direction information.

7. The computing device according to claim 1, wherein the augment information comprises at least one of audio information, textual information, and video information.

8. The computing device according to claim 1, wherein the features of the points of interest are associated with at least one of a person and an object included in the frames of the video stream.

9. The computing device according to claim 1, wherein the machine readable instructions are further to cause the processor to generate and detect chirp signals, wherein the chirp signals are used to generate direction augment information, and wherein the direction augment information is to be displayed on the display screen with the video stream.

10. A method for generating augmented video streams, said method comprising:
capturing a video stream with a video camera of a computing device;
displaying the captured video stream on a display screen of the computing device;
extracting features of points of interest in frames of the captured video stream;
relating patterns from a series of two or more of the frames to reduce an amount of points of interest in the frames that the server computer is to use in identifying the augment information;
transmitting the extracted features of the points of interest and the related patterns to a server computer that is to use the extracted features of the points of interest to identify augment information related to the points of interest in the frames;
receiving, in the computing device, the augment information from the server computer;
augmenting, by a processor, the captured video stream with the augment information to generate an augmented video stream; and
displaying the augmented video stream on the display screen.

11. The method according to claim 10, further comprising:
generating geographical information associated with the frames of the captured video; and
wherein transmitting the extracted features further comprises wirelessly transmitting the extracted features and the geographical information to the server computer over a network.

12. The method according to claim 10, said method further comprising:
sensing a direction of the video camera in capturing the video stream; and
transmitting information pertaining to the direction of the video camera to the server computer, wherein the server computer is to further use the information pertaining to the direction of the video camera in identifying the augment information.

13. The method according to claim 10, further comprising:
exchanging chirp signals with another computing device to determine a distance from a location of the processor to the another computing device;
transmitting information related to the determined distance from the location of the processor to the another computing device to the server computer, wherein the server computer is to identify direction augment information from the determined distance;
receiving the direction augment information from the server computer; and
displaying the direction augment information on a display screen with the augmented video stream.

14. A non-transitory computer readable storage medium on which is stored machine readable instructions that when executed by a processor cause the processor to:
capture a video stream with a video camera of a computing device;
display the captured video stream on a display screen of the computing device;
extract features of points of interest in frames of the captured video stream;
relate patterns from a series of two or more of the frames to reduce an amount of points of interest in the frames that the server computer is to use in identifying the augment information;
transmit the extracted features of the points of interest and the related patterns to a server computer that is to use the extracted features of the points of interest to identify augment information related to the points of interest in the frames;
receive, in the computing device, the augment information from the server computer;
augment the captured video stream with the augment information to generate an augmented video stream; and
display the augmented video stream on the display screen.

15. A computer comprising:
a processor; and
a memory on which is stored machine readable instructions that are to cause the processor to:
receive characteristics and geographical information of objects in frames of a video stream accessed in a computing device;
use the characteristics and the geographical information to reduce a set of known objects that potentially match the objects in the frames of the video stream;
recognize the objects from the reduced set of objects that potentially match the objects;
determine augment information associated with the recognized objects; and
transmit the augment information to the computing device, wherein the computing device is to augment the video stream with the augment information.

16. The computer according to claim 15, wherein the machine readable instructions are further to cause the processor to access at least one of an object database and a facial recognition database to reduce the set of known objects that potentially match the objects and recognize the objects from the reduced set of objects.

17. The computer according to claim 15, wherein the computing device is to capture the video stream, and wherein the machine readable instructions are further to cause the processor to receive information pertaining to a direction in which the computing device is facing during capture of the video stream and to use the direction information to reduce the set of known objects that potentially match the objects in the frames of the video stream.

18. The computer according to claim 15, wherein the machine readable instructions are further to cause the processor to:
   verify an identity of the computing device;
   determine a profile associated with the identity of the computing device in response to the identity of the computing device being verified; and
   determine the augment information as augment information that is associated with the recognized objects and based on the determined profile.

19. The computer according to claim 15, wherein the characteristics of the frames comprise features of points of interest in the frames extracted by the computing device.

20. The computer according to claim 15, wherein the characteristics of the frames comprise patterns from a series of two or more of the frames as related by the computing device.

21. A method for determining augment information for a video stream accessed by a computing device, said method comprising:
   receiving characteristics and geographical information of objects in frames of the video stream from the computing device;
   using the received characteristics and geographical information of the objects in the frames of the video stream to reduce a set of known objects that potentially match the objects in the frames of the video stream;
   recognizing the objects from the reduced set of objects that potentially match the objects;
   determining, by a processor, augment information associated with the recognized objects; and
   transmitting the augment information to the computing device, wherein the computing device is to augment the video stream with the augment information.

22. The method according to claim 21, wherein using the received characteristics and geographical information of the objects to reduce the set of known objects further comprises using the received characteristics and geographical information of the objects to reduce the set of known objects from the known objects stored in at least one of an object database and a facial recognition database.

23. The method according to claim 21, wherein the computing device is to capture the video stream, said method further comprising:
   receiving information pertaining to a direction in which the computing device is facing during capture of the video stream; and
   using the direction information to reduce the set of known objects that potentially match the objects in the frames of the video stream.

24. The method according to claim 21, further comprising:
   verifying an identity of the computing device;
   determining a profile associated with the identity of the computing device in response to the identity of the computing device being verified; and
   determining the augment information as augment information that is associated with the recognized objects and based on the determined profile.

25. The method according to claim 21, wherein the geographical information of the objects comprises information identifying a geographical location at which the video stream was captured, and wherein using the received characteristics and geographical information of the objects to reduce the set of known objects further comprises using the geographical information of the objects to filter out known objects that do not correspond to the geographical information of the objects.

26. The method according to claim 21, wherein determining the augment information associated with the recognized objects further comprises accessing a database that stores information identifying which of a plurality of augmented information is associated with of a plurality of recognized objects.

27. A non-transitory computer readable storage medium on which is stored machine readable instructions that when executed by a processor cause the processor to:
   receive characteristics and geographical information of objects in frames of the video stream from the computing device;
   use the received characteristics and geographical information of the objects in the frames of the video stream to reduce a set of known objects that potentially match the objects in the frames of the video stream;
   recognize the objects from the reduced set of objects that potentially match the objects;
   determine augment information associated with the recognized objects; and
   transmit the augment information to the computing device, wherein the computing device is to augment the video stream with the augment information.

* * * * *